United States Patent
Maiuro (10) Patent No.: US 6,374,867 B1
(45) Date of Patent: Apr. 23, 2002

(54) LIQUID CONTAINER WITH INTEGRAL FILL/DRAIN CONDUIT

(75) Inventor: Tony Maiuro, St. Charles, MO (US)

(73) Assignee: Contico International, L.L.C., St. Louis, MO (US)

( * ) Notice: Subject to any disclaimer, the term of this patent is extended or adjusted under 35 U.S.C. 154(b) by 0 days.

(21) Appl. No.: 09/741,138

(22) Filed: Dec. 19, 2000

(51) Int. Cl.⁷ .............................. B65B 1/04; B65B 3/04
(52) U.S. Cl. ............................ 141/2; 141/18; 141/115; 141/382; 141/388; 222/481; 222/527
(58) Field of Search ................................ 141/2, 18, 115, 141/311 R, 325, 326, 327, 382, 388; 222/481, 482, 505, 527, 528

(56) References Cited

U.S. PATENT DOCUMENTS

| | | |
|---|---|---|
| 1,236,156 A | 8/1917 | Finnell |
| 3,889,705 A | 6/1975 | Coderre |
| 4,042,142 A * | 8/1977 | Ruano .................. 220/4 B |
| 4,420,005 A * | 12/1983 | Armstrong ............ 134/100 |
| 4,546,900 A | 10/1985 | Lackey |
| 4,557,406 A | 12/1985 | Olinger et al. |
| 4,713,589 A | 12/1987 | Smith, Jr. |
| 4,798,307 A | 1/1989 | Evrard |
| 4,888,847 A | 12/1989 | Montijo |
| 5,433,085 A * | 7/1995 | Rogers .................. 62/372 |
| 5,622,279 A | 4/1997 | Schutz |
| 6,047,866 A * | 4/2000 | Brown .................. 222/608 |
| 6,128,803 A | 10/2000 | Dickinson et al. |

* cited by examiner

Primary Examiner—Timothy L. Maust
(74) Attorney, Agent, or Firm—Thompson Coburn LLP (57) ABSTRACT

A liquid container comprises a container body, a hollow fill/drain conduit and a retaining member. The container body includes a base and at least one side wall extending generally upwardly from the base to define a liquid reservoir. The side wall includes a first port adjacent to the base. The fill/drain conduit has a first end and a second end. The first end of the conduit includes a first connector adapted for connecting the first end of the conduit with the first port in a manner to permit fluid communication between the conduit and the liquid reservoir via the first port. The second end of the conduit is moveable relative to the first end of the conduit between a stored position and a drain position. In the stored position, the second end of the conduit is positioned above a maximum recommended liquid level of the liquid reservoir. In the drain position, the second end of the conduit is below the first port to thereby permit gravity drainage of the liquid reservoir when the second end is in the drain position. The retaining member is connected to the container body above the maximum recommended liquid level of the liquid reservoir. The retaining member is adapted for engagement with the second end of the conduit in a manner for retaining the second end of the conduit above the maximum recommended liquid level of the liquid reservoir when the conduit is in its storage position.

20 Claims, 7 Drawing Sheets

LIQUID CONTAINER WITH INTEGRAL FILL/DRAIN CONDUIT

BACKGROUND OF THE INVENTION

The present invention relates generally to the field of portable liquid containers. More particularly, the present invention relates to mop buckets and other bucket-like containers that are adapted to contain liquids for use in connection with various cleaning activities.

The use of portable liquid containers, including bucket-like containers, in connection with various cleaning activities is well known in the art. Typically, such containers include a bucket-like container body that defines a liquid reservoir for holding cleaning solutions or other liquids. Such containers often include wheels or casters that permit the containers to be moved about easily, even when filled. Some prior art mop buckets include a drain port at the bottom of the liquid reservoir to facilitate drainage of the contents of the reservoir. In some cases, the drain ports comprise simple drain plugs and in other cases the drain ports comprise hand operable valves or spigots. In either case, it is necessary to close the drain port (either by plugging the drain hole or by manually turning the valve or spigot to a closed position) before filling the liquid reservoir with liquid. Then, the container can be filled to a desired level and the liquid contents will be retained in the liquid reservoir. To drain the contents of the container, the user must open the drain port (either by removing the plug from the drain hole or by manually turning the valve or spigot to an open position). Because the drain port is located at the bottom of the liquid reservoir, the contents of the liquid reservoir will simply drain by gravity through the drain port. Such drain ports are convenient because they allow controlled drainage of the container without the need to lift and tilt the container (which may be rather heavy and unwieldy when filled with liquid) to spill the contents out of the top of the container. In general, controlled drainage through a drain port at the bottom of the container is also less messy and less likely to cause splashing, which is particularly important when the liquid contents being drained are contaminated or laden with dangerous cleaning chemicals.

Although liquid containers with such drain ports have proven to be useful and functional, certain shortcomings prevent them from representing an ideal solution. Because the drain ports are typically located on or near an underside of the container, the user must bend down (and perhaps reach under) the container to access the drain plug or valve. Also, it is often desirable to drain the contents of such containers into floor level "spill sinks" that include a drain area bounded or dammed by short booms or walls (typically 6 to 12 inches above the floor). Consequently, in order to drain the contents of a filled container into such a spill sink, the user must first lift the filled container over the boom or wall and into the drain area of the spill sink. Again, when such containers are filled with liquid, they can be rather heavy and unwieldy, and such heavy lifting presents a risk of injury to the user. It also increases the likelihood that the contents of the container will be spilled or splashed about, which presents a danger if the liquid contents contain dangerous contaminants or cleaning chemicals. Filling the container from the top, as is conventionally done, may also present problems. When filling the container from a wall mounted faucet, it is necessary to position the container in close proximity to the wall so that the liquid reservoir can be positioned directly under the faucet. This relatively uncontrolled method of filling presents another opportunity for splashing and mess.

Thus, there is a need for a liquid container that includes an improved means for filling and draining the liquid reservoir of the container; that reduces instances in which the user is forced to bend down and reach under the container; that reduces instances in which the user will be forced to lift the container when filled; and that provides for more controlled filling and draining thereby reducing the danger of spilling or splashing the contents of the container.

SUMMARY OF THE INVENTION

The present invention overcomes the problems and deficiencies in the prior art by providing a novel liquid container with an integral fill/drain conduit for safely and efficiently transferring liquid into and out of the container. In general, a liquid container of the present invention includes a container body, a hollow fill/drain conduit and a retaining member. The container body includes a base and at least one side wall extending generally upwardly from the base to define a liquid reservoir. The side wall includes a first port adjacent to the base. The fill/drain conduit has a first end and a second end. The first end of the conduit includes a first connector adapted for connecting the first end of the conduit with the first port in a manner to permit fluid communication between the conduit and the liquid reservoir via the first port. The second end of the conduit is moveable relative to the first end of the conduit between a stored position and a drain position. In the stored position, the second end of the conduit is positioned above a maximum recommended liquid level of the liquid reservoir. In the drain position, the second end of the conduit is below the first port to thereby permit gravity drainage of the liquid reservoir when the second end is in the drain position. The retaining member is connected to the container body above the maximum recommended liquid level of the liquid reservoir. The retaining member is adapted for engagement with the second end of the conduit in a manner for retaining the second end of the conduit above the maximum recommended liquid level of the liquid reservoir when the conduit is in its storage position.

A method for using a liquid container of the present invention comprises the steps of providing a container body substantially as described above; connecting the first connector of the conduit with the first port of the container body in a manner to permit fluid communication between the conduit and the liquid reservoir via the first port; disengaging the second connector of the conduit from the retaining member; moving the conduit from its stored position to a lower fill position wherein the second connector of the conduit is adjacent a liquid source; connecting the second connector of the conduit to the liquid source in a manner to permit liquid to flow from the liquid source into the liquid reservoir through the conduit and through the first port; and filling the liquid reservoir to a level at or below the maximum recommended liquid level of the liquid reservoir. The method further comprises the step of draining the liquid reservoir by disconnecting the second connector of the conduit from the retaining member; and moving the conduit to a drain position wherein the second end of the conduit is below the first port to thereby permit gravity drainage of the liquid reservoir through the first port and through the conduit.

In another aspect of the present invention, a method is provided for using a liquid container having a container body with a liquid reservoir, a first port located adjacent a base of the container body, a second port located above a maximum recommended liquid level of the liquid reservoir, a flexible fill/drain conduit having a first end with a first connector adapted for connection with the first port and a second end with a second connector adapted for connection with the second port when the conduit is in a storage position, and a valve adjacent the first port and operable between an open position that permits fluid communication between the conduit and the liquid reservoir via the first port and a closed position that substantially prevents fluid communication between the conduit and the liquid reservoir via the first port. The method comprises the steps of connecting the second connector of the conduit with the second port in manner to permit fluid communication between the conduit and the liquid reservoir via the second port; moving the valve to its closed position; disengaging the first connector of the conduit from the first port; moving the conduit from its storage position to an upper fill position wherein the first connector of the conduit is adjacent a liquid source; connecting the first connector of the conduit to the liquid source in a manner to permit liquid to flow from the liquid source into the liquid reservoir through the conduit and through the second port; and filling the liquid reservoir to a level at or below the maximum recommended liquid level of the liquid reservoir. The method further comprises the step of draining the liquid reservoir by disconnecting the second connector of the conduit from the second ports; moving the conduit to a drain position wherein the second end of the conduit is below the first port; and moving the valve to its open position to thereby permit gravity drainage of the liquid reservoir through the first port and through the conduit.

While the principal advantages and features of the present invention have been described above, a more complete and thorough understanding and appreciation for the invention may be attained by referring to the drawings and description of the preferred embodiments, which follow.

BRIEF DESCRIPTION OF THE DRAWINGS

Reference characters used in the written specification refer to corresponding parts shown in the drawings.

DETAILED DESCRIPTION OF THE PREFERRED EMBODIMENTS

A liquid container of the present invention is represented in its entirety in the Figures by the reference numeral 20. In general, the container 20 comprises a container body 22 having a base 24 and four reservoir side walls (i.e., a forward reservoir wall 26, a back reservoir wall 28, a left side reservoir wall (not shown) and a right side reservoir wall 30). The four reservoir side walls extend generally upwardly from the base 24 to define a liquid reservoir 34. Preferably, the container 20 also includes a plurality of caster wheels 36 to permit the container 20 to be moved about easily, even when filled. The caster wheels 36 also serve to space the base 24 of the container 20 from the floor.

Preferably, the container assembly 20 further comprises an integral wringing mechanism, represented generally in the Figures by the reference numeral 40, adjacent the liquid reservoir 34. The wringing mechanism 40 is preferably of the type shown and described in U.S. Pat. No. 6,128,803 issued to Dickinson et al. Oct. 10, 2000, though other wringing mechanisms (or no wringing mechanism at all) could be used with the container 20 without departing from the scope of the invention.

Figure 3:
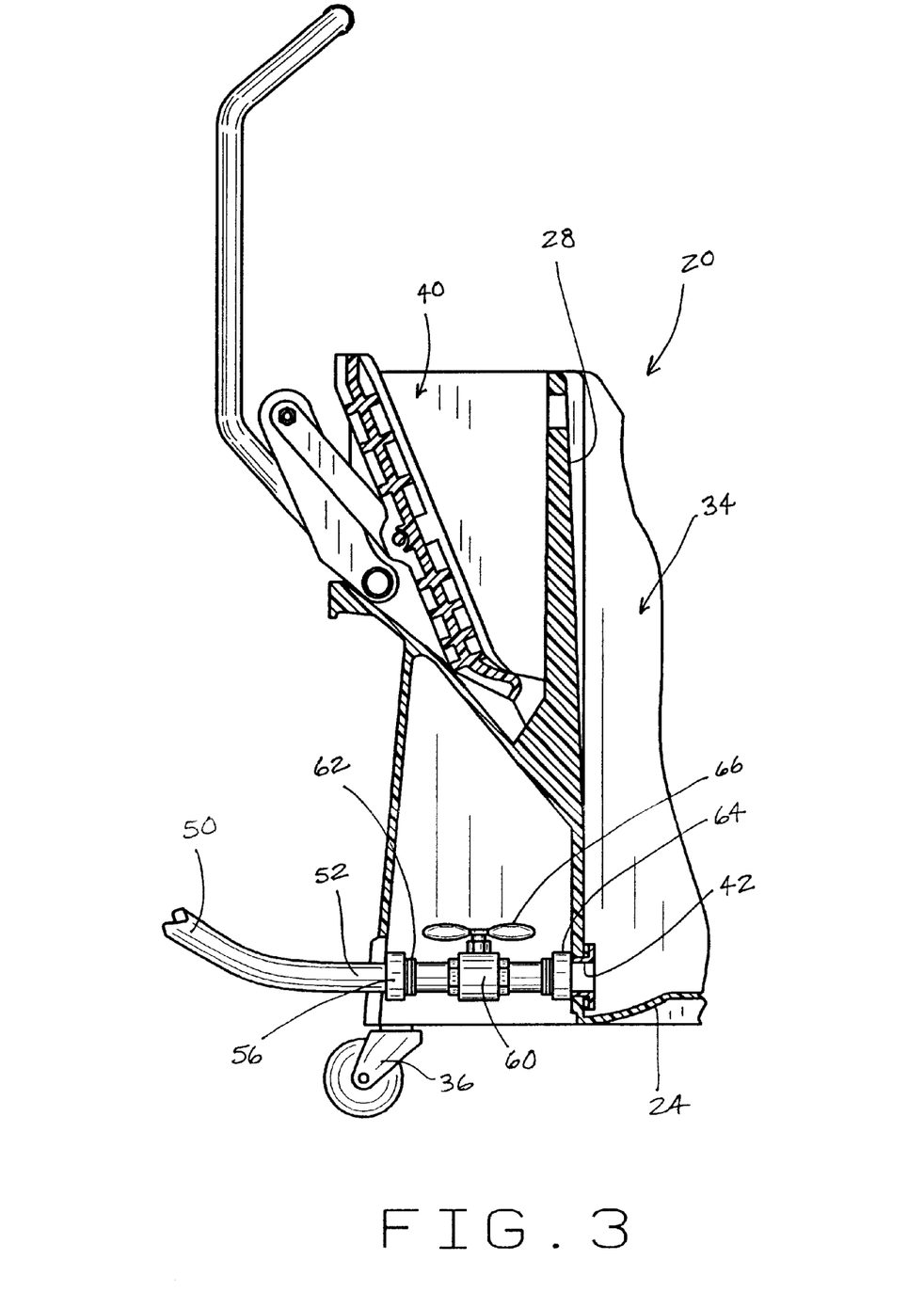
FIG. 3 is a partial cross-sectional view of the liquid container of FIGS. 1 and 2 showing detail of the connection between the conduit and the first port.

Referring to FIG. 3, it can be seen that back reservoir wall 28 of the container 20 includes a first port 42 near the bottom of the back reservoir wall 28 where the back wall 28 meets the base 24 of the container 20. Preferably, the first port 42 includes an externally threaded fixture (not shown) extending from the outside of the back reservoir wall 28.

Figure 1:
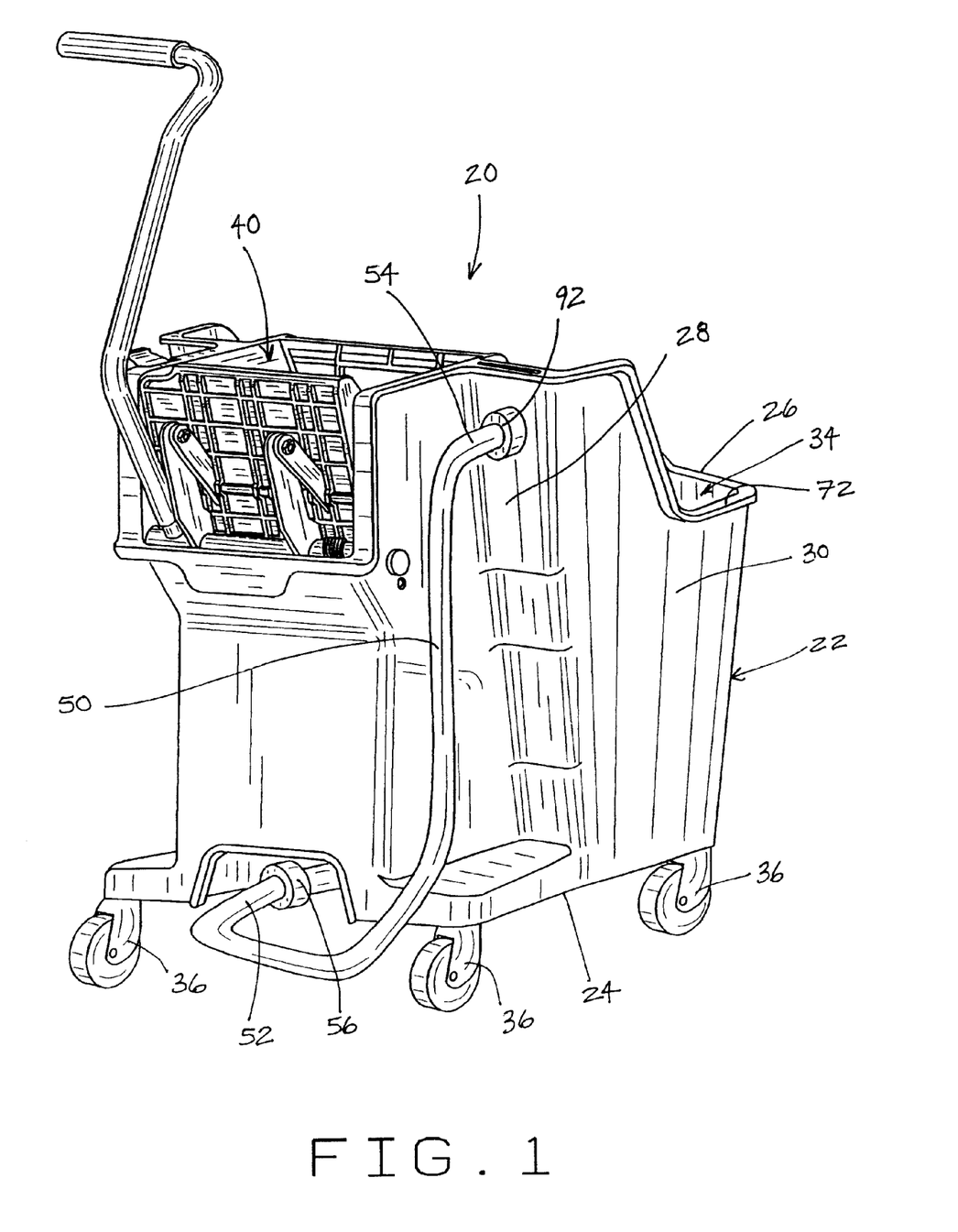
FIG. 1 is a perspective view of a liquid container of the present invention.

As shown in FIG. 1, the container 20 further comprises a hollow fill/drain conduit 50. Preferably, the conduit 50 comprises a length of flexible rubber hose, but could be formed of other materials without departing from the scope of the invention. The conduit 50 has a first end 52 and a second end 54. The first end 52 of the conduit 50 includes a first connector 56. The first connector 56 is adapted to connect the first end 52 of the conduit 50 with the first port 42 in a manner to permit fluid communication between the conduit 50 and the liquid reservoir 34 via the first port 42. Preferably, the first connector 56 includes an internally threaded collar adapted for threaded engagement with the externally threaded portion of the first port 42 or with an externally threaded portion of another element (e.g., a valve) connected between the conduit 50 and the first port 42.

In the preferred embodiment of the invention shown in FIG. 3, the container 20 further comprises a valve 60 between the first end 52 of the conduit 50 and the first port 42. Preferably, one end of the valve 60 includes an externally threaded connector 62 adapted for threaded engagement with the internally threaded collar of the first connector 56 and the other end of the valve 60 includes an internally threaded connector 64 adapted for threaded engagement with the externally threaded portion of the first port 42. A handle 66 is connected to a valve element (not shown) and is adapted to permit manual operation of the valve element between an open position that permits fluid communication between the conduit 50 and the liquid reservoir 34 via the first port 42 and a closed position that substantially prevents fluid communication between the conduit 50 and the liquid reservoir 34 via the first port 42.

Preferably, the second end 54 of the conduit 50 is freely moveable relative to the first end 52. As discussed below in more detail, the second end 54 of the conduit 50 is moveable relative to the first end 52 of the conduit 50 to a storage position (shown in FIGS. 1 and 2); a primary (lower) fill position (shown in FIG. 4); an alternate (upper) fill position (shown in FIG. 5); and a drain position (shown in FIG. 6).

In the storage position (shown in FIGS. 1 and 2), the second end 54 of the conduit is positioned above a maximum recommended liquid level 70 (represented by a dashed line in FIG. 2) of the liquid reservoir 34. Of course, the maximum recommended liquid level 70 must be below the level of an upper rim 72 of the container 20 to avoid overflowing. However, preferably, the maximum recommended liquid level 70 is spaced below the upper rim 72 a distance sufficient to substantially reduce the likelihood of undesired splashing and sloshing of liquid from the liquid reservoir 34 during use. It is also important for the maximum recommended liquid level 70 to be below the level of the upper rim 72 to accommodate the insertion of mops, cleaning rags or sponges (not shown) during use. Thus, it is important for the second end 54 of the conduit 50 to be positioned above the maximum recommended liquid level 70 when in the storage position to avoid a back flow of liquid from the liquid reservoir 34 into the conduit 50 during use.

Figure 6:
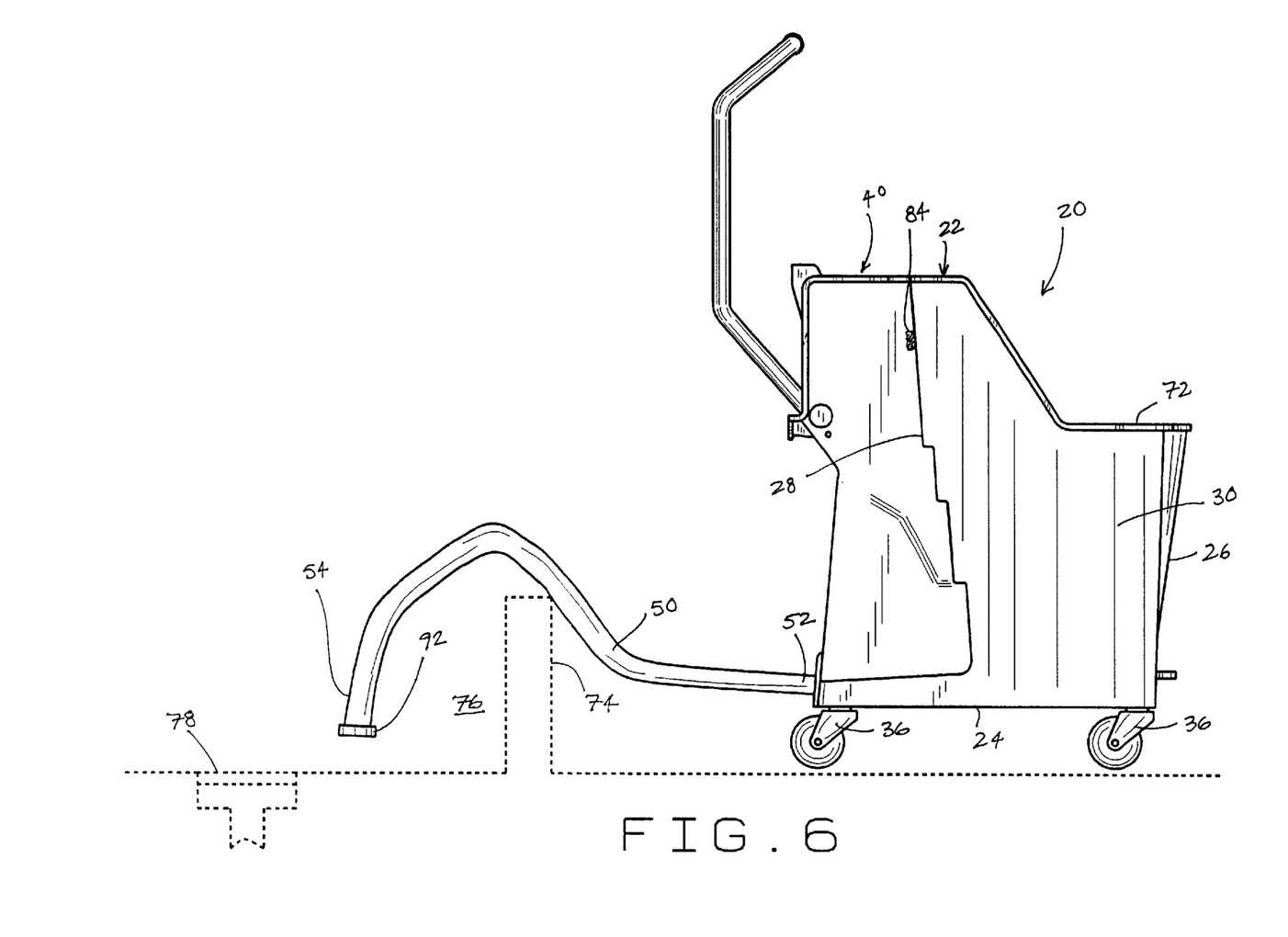
FIG. 6 is a side elevational view of the liquid container of the present invention shown in a drain mode.

In the drain position (shown in FIG. 6), the second end 54 of the conduit 50 is positioned below the level of the first port 42 to thereby permit gravity (i.e., siphoning) drainage of the liquid reservoir 34 when the second end 54 is in the drain position. As shown in FIG. 6, the flexible nature of the conduit 50 allows the conduit to be looped over the boom or wall 74 of a spill sink 76, thereby permitting the contents of the liquid reservoir 34 to be siphoned out of the liquid reservoir 34, through the first port 42, through the conduit 50 and into the spill sink 76. Thus, the contents of the container 20 can be drained into the spill sink 76 without the need to first lift the filled container 20 over the boom or wall 74 and into a drain area 78 of the sink 76.

Figure 2:
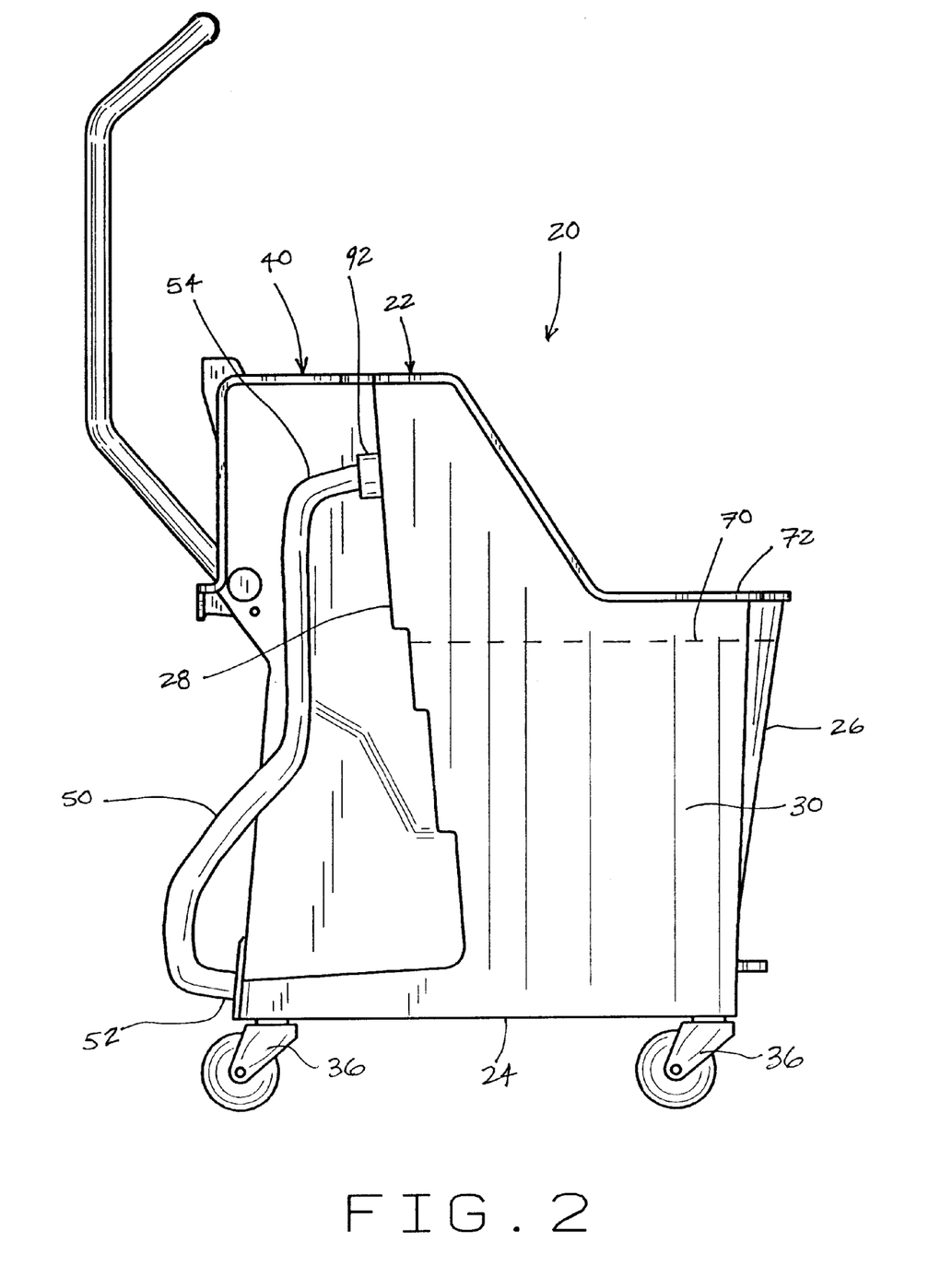
FIG. 2 is a side elevational view of the liquid container of FIG. 1 shown in a storage mode.
Figure 7:
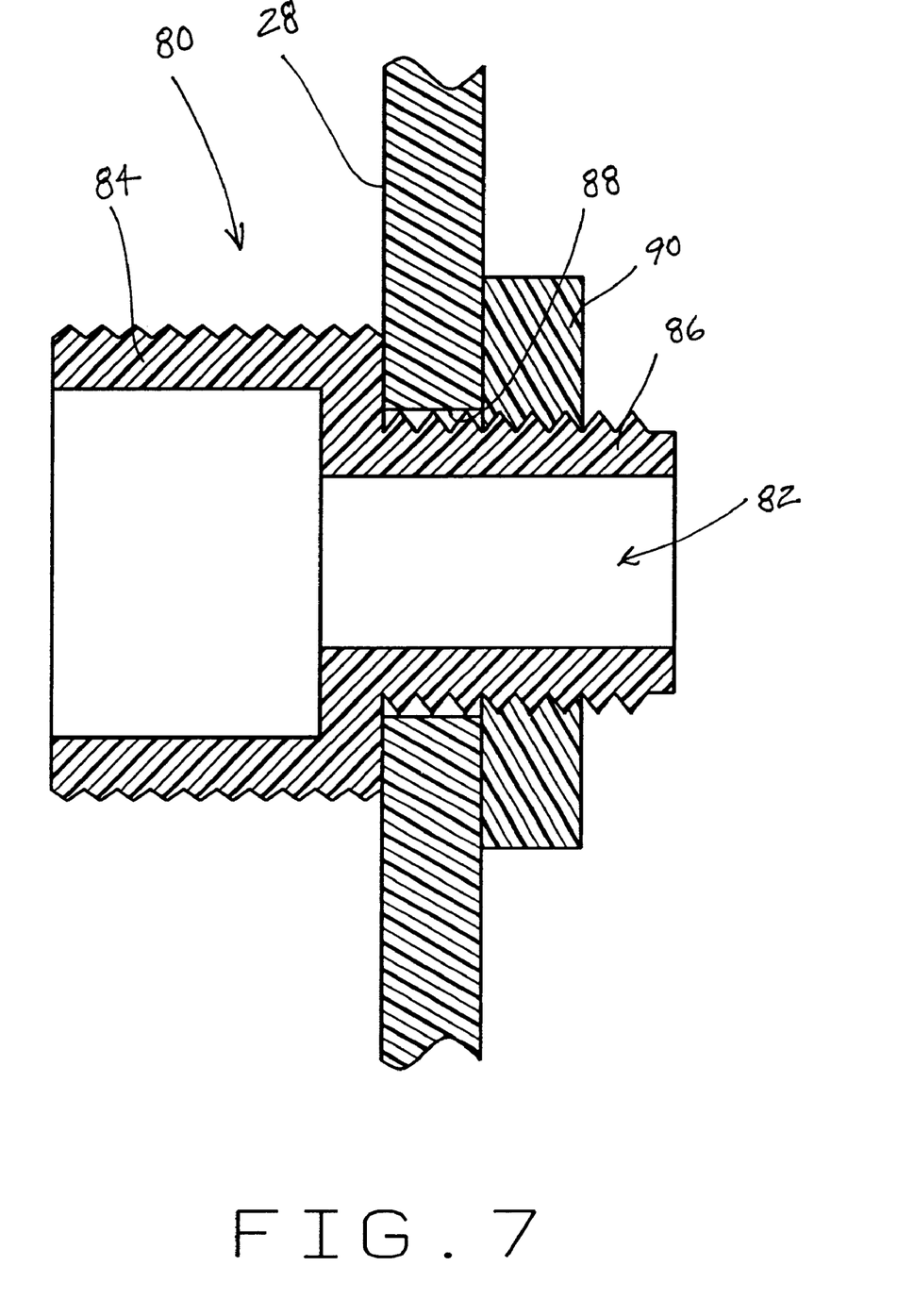
FIG. 7 is an enlarged, fragmented cross-sectional view of the second port.

As best shown in FIGS. 6 and 7, the container further comprises a retaining member 80 connected to the container body 22, and preferably to the back reservoir wall 28, above the maximum recommended liquid level 70 of the liquid reservoir 34. The retaining member 80 is adapted for engagement with the second end 54 of the conduit 50 in a manner for retaining the second end 54 above the maximum recommended liquid level 70 of the liquid reservoir 34 when the conduit 50 is in its storage position (FIGS. 1 and 2). As shown in FIG. 7, the retaining member 80 preferably comprises a second port 82 that extends through the back reservoir wall 28 of the container 20 above the maximum recommended liquid level 70. Preferably, the retaining member 80 includes a hollow fixture with an externally threaded outer portion 84 that lies substantially outside the back reservoir wall 28 and an externally threaded inner portion 86 that passes through an aperture 88 in the back wall 28 and into the liquid reservoir 34 above the maximum recommended liquid level 60. Preferably, an internally threaded nut 90 is tightened onto the inner portion 86 of the hollow fixture to secure the fixture to the back wall 28 of the container 20. Preferably, the second end 54 of the conduit 50 includes a second connector 92 with an internally threaded portion that is adapted for threaded engagement with the externally threaded outer portion 84 of the fixture in a manner for retaining the second end 54 of the conduit 50 in its storage position (FIGS. 1 and 2) above the maximum recommended liquid level 70 of the liquid reservoir 34. Thus, in its storage position (FIGS. 1 and 2) the internally threaded collar of the first connector 56 is in threaded engagement with the externally threaded connector 62 of the valve 60 and the second connector 92 is in threaded engagement with the outer fixture portion 84 of the retaining member 80.

Figure 4:
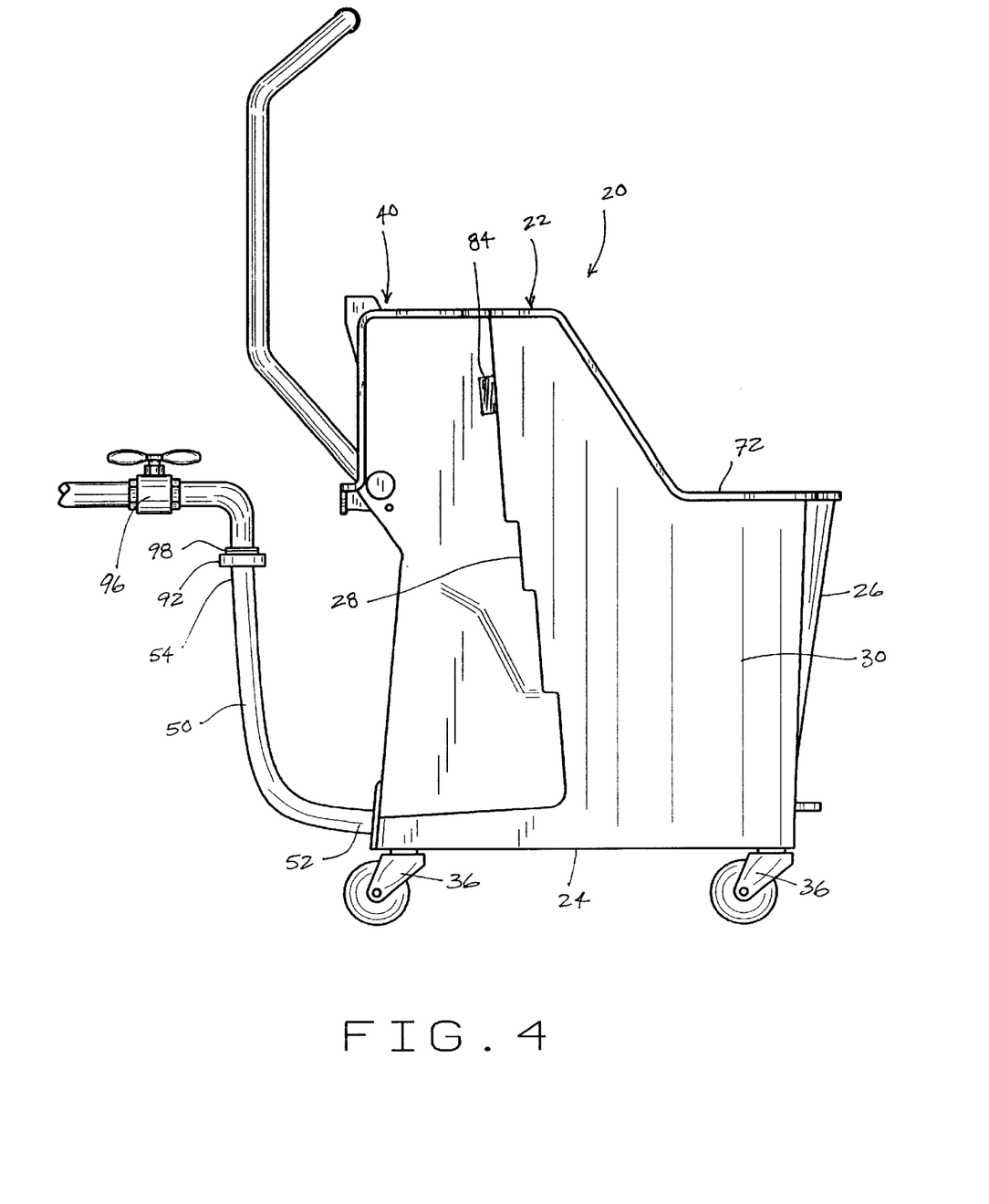
FIG. 4 is a side elevational view of the liquid container of the present invention shown in a lower fill mode.

FIG. 4 illustrates the primary (lower) fill position of the conduit 50. In this position, the first end 52 of the conduit 50 is connected to the first port 42 in a manner to permit fluid communication between the conduit and the liquid reservoir 34, via the valve 60, as illustrated in FIG. 3. The second end 54 of the conduit 50 is connected to a liquid source 96. Preferably, an internally threaded portion of the second connector 92 of the conduit is adapted for threaded engagement with an externally threaded end portion 98 of the liquid source 96. Thus, when the conduit 50 is in the lower fill position shown in FIG. 4, liquid flowing from the liquid source 96 is permitted to flow through the conduit 50, through the valve 60 (when the valve is in an open position) and into the liquid reservoir 34 via the first port 42. Once the liquid reservoir 34 has been filled to a desired level, the liquid source is turned off and the valve 60 is moved to a closed position to prevent fluid communication between the conduit 50 and the liquid reservoir 34. The second end 54 of the conduit 50 is then disconnected from the liquid source 96 and the conduit 50 is moved back to its storage position (shown in FIGS. 1 and 2).

Figure 5:
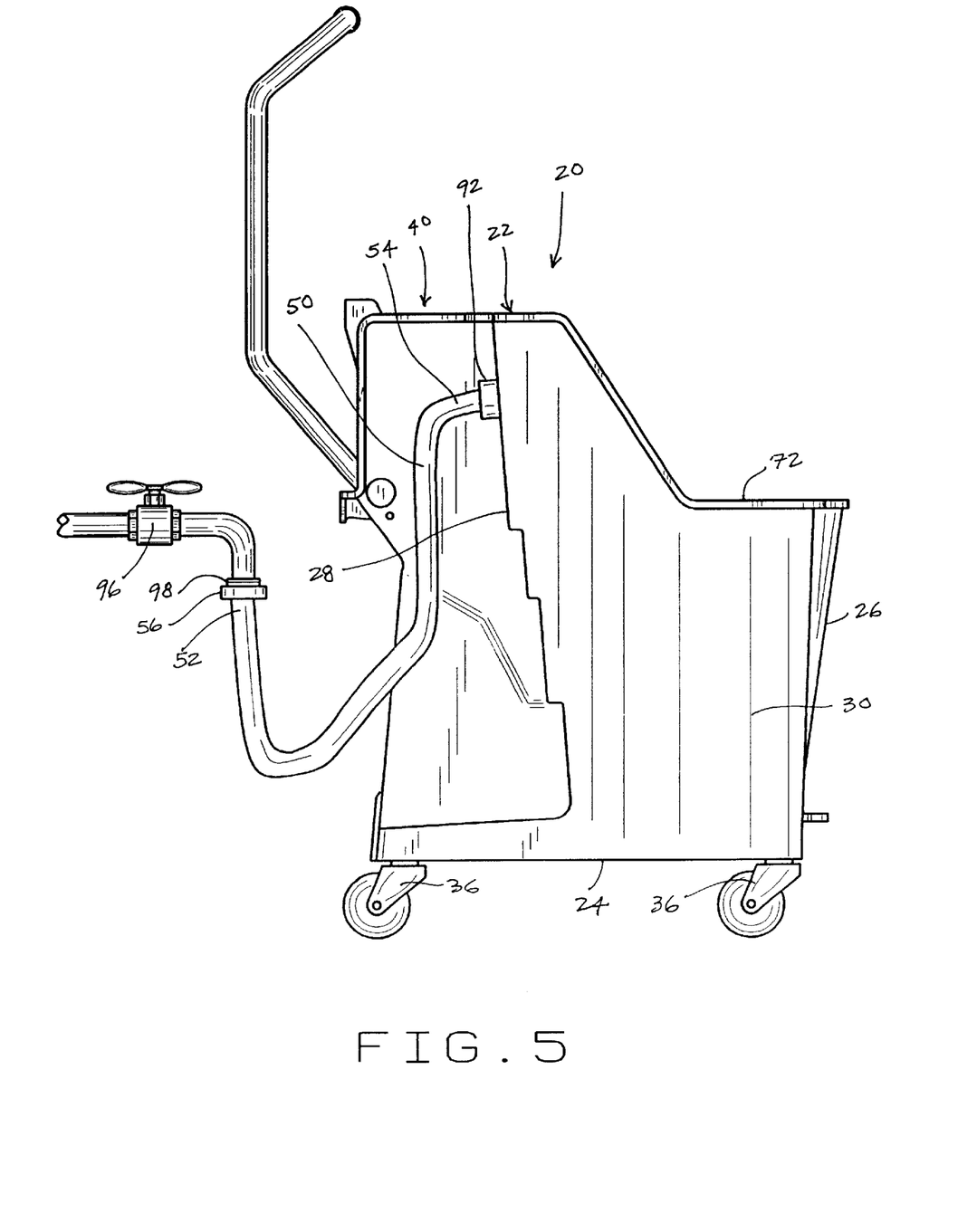
FIG. 5 is a side elevational view of the liquid container of the present invention shown in an upper fill mode.

FIG. 5 illustrates an alternate (upper) fill position of the conduit 50. In this position, the second end 54 of the conduit 50 is connected to the retaining member 80 (i.e., the second port 82) in a manner to permit fluid communication between the conduit 50 and the liquid reservoir 34 via the second port 82, as illustrated in FIG. 5. The first end 52 of the conduit 50 is disconnected from the valve 60 and connected instead to the liquid source 96. Preferably, the internally threaded collar of the first connector 56 of the conduit 50 is adapted for threaded engagement with the externally threaded end portion 98 of the liquid source 96. Thus, when the conduit 50 is in the upper fill position shown in FIG. 5, liquid flowing from the liquid source 96 is permitted to flow through the conduit 50 and into the liquid reservoir 34 via the second port 82. Once the liquid reservoir 34 has been filled to a desired level, the liquid source 96 is turned off. Then, the second end 54 of the conduit 50 is disconnected from the liquid source 96 and the conduit 50 is moved back to its storage position (shown in FIGS. 1 and 2).

Thus, a primary method for filling the container 20 of the present invention preferably comprises the steps of connecting the first connector 56 of the conduit 50 with the first port 42 in a manner to permit fluid communication between the conduit 50 and the liquid reservoir 34 via the first port 42; disengaging the second connector 92 of the conduit 50 from the retaining member 80; moving the conduit 50 from its storage position (shown in FIGS. 1 and 2) to the lower fill position (shown in FIG. 4) wherein the second connector 92 of the conduit 50 is adjacent the liquid source 96; connecting the second connector 92 of the conduit 50 to the liquid source 96 in a manner to permit liquid to flow from the liquid source 96 into the liquid reservoir 34 through the conduit 50 and through the first port 42; moving the valve 60 to its open position; filling the liquid reservoir 34 to a level at or below the maximum recommended liquid level 70 of the liquid reservoir 34; moving the valve 60 to its closed position; disconnecting the second connector 92 of the conduit 50 from the liquid source 96; moving the conduit 50 from its lower fill position to back to its storage position; and reconnecting the second connector 92 to the retaining member 80.

An alternative method for filling the container 20 of the present invention preferably comprises the steps of connecting the second connector 92 of the conduit 50 with the second port 82 in a manner to permit fluid communication between the conduit 50 and the liquid reservoir 34 via the second port 82; moving the valve 60 to its closed position; disengaging the first connector 52 of the conduit 50 from the valve 60; moving the conduit from its storage position (shown in FIGS. 1 and 2) to an upper fill position (shown in FIG. 5) wherein the first connector 52 is adjacent the liquid source 96; connecting the first connector 52 to the liquid source 96 in a manner to permit liquid to flow from the liquid source 96 into the liquid reservoir 34 through the conduit 50 and through the second port 82; filling the liquid reservoir 34 to a level at or below the maximum recommended liquid level 70 of the liquid reservoir 34; disconnecting the first connector 52 from the liquid source 96; moving the conduit 50 from its upper fill position back to its storage position; and reconnecting the first connector 52 to the valve 60.

Regardless of which filling method is used, a method of draining the container 20 after use comprises the steps of disconnecting the second connector 92 from the retaining member 80; moving the conduit 50 to the drain position (shown in FIG. 6) wherein the second end 54 of the conduit 50 is positioned at a level below the level of the first port 42; and moving the valve 60 to its open position to thereby permit gravity (i.e., siphoning) drainage of the liquid reservoir 34 through the first port 42 and through the conduit 50.

In view of the above, it can be seen that the present invention overcomes problems associated with the prior art and achieves other advantageous results. As various changes could be made without departing from the scope of the invention, it is intended that all matter contained in the above description and shown in the accompanying drawings be interpreted as illustrative and not limiting. It should be understood that other configurations of the present invention could be constructed, and different uses could be made, without departing from the scope of the invention as set forth in the following claims.

What is claimed is:

1. A liquid container comprising:
    a container body including a base and at least one side wall extending generally upwardly from the base to define a liquid reservoir, said side wall including a first port adjacent the base;
    a hollow fill/drain conduit having a first end and a second end, the first end including a first connector adapted for connecting the first end of the conduit with the first port in a manner to permit fluid communication between the conduit and the liquid reservoir via the first port, the second end of the conduit being moveable relative to the first end of the conduit between a storage position wherein the second end is above a maximum recommended liquid level of the liquid reservoir and a drain position wherein the second end is below the first port to thereby permit gravity drainage of the liquid reservoir when the second end is in the drain position; and
    a retaining member connected to the container body above the maximum recommended liquid level of the liquid reservoir, the retaining member being adapted for engagement with the second end of the conduit in a manner for retaining the second end of the conduit above the maximum recommended liquid level of the liquid reservoir when the conduit is in its storage position;
    wherein the second end of the conduit includes a second connector that is adapted to be connected to a liquid source and wherein the conduit is moveable to a lower fill position wherein the second connector of the conduit is connected to the liquid source in a manner to permit liquid to flow from the source into the liquid reservoir through the conduit and through the first port.

2. The liquid container of claim 1 wherein the second connector has an internally threaded portion.

3. The liquid container of claim 2 wherein the retaining member includes an externally threaded portion that is adapted for threading engagement with the internally threaded portion of the second connector of the conduit when the conduit is in its storage position.

4. The liquid container of claim 1 wherein the conduit includes a flexible hose.

5. A liquid container comprising:
    a container body including a base and at least one side wall extending generally upwardly from the base to define a liquid reservoir, said side wall including a first port adjacent the base;
    a hollow fill/drain conduit having a first end and a second end, the first end including a first connector adapted for connecting the first end of the conduit with the first port in a manner to permit fluid communication between the conduit and the liquid reservoir via the first port, the second end of the conduit being moveable relative to the first end of the conduit between a storage position wherein the second end is above a maximum recommended liquid level of the liquid reservoir and a drain position wherein the second end is below the first port to thereby permit gravity drainage of the liquid reservoir when the second end is in the drain position;
    a retaining member connected to the container body above the maximum recommended liquid level of the liquid reservoir, the retaining member being adapted for engagement with the second end of the conduit in a manner for retaining the second end of the conduit above the maximum recommended liquid level of the liquid reservoir when the conduit is in its storage position; and
    a valve connected between the first end of the conduit and the first port, the valve being operable between an open position that permits fluid communication between the conduit and the liquid reservoir via the first port and a closed position that substantially prevents fluid communication between the conduit and the liquid reservoir via the first port.

6. The liquid container of claim 5 wherein the first port includes an externally threaded portion that is adapted for threaded engagement with an internally threaded portion of the first connector of the conduit.

7. The liquid container of claim 5 wherein the retaining member includes a second port positioned above the maximum recommended liquid level of the liquid reservoir.

8. The liquid container of claim 7 wherein the second end of the conduit includes a second connector adapted for engagement with the retaining member in a manner to permit fluid communication between the conduit and the liquid reservoir via the second port.

9. The liquid container of claim 8 wherein the first connector of the conduit is adapted to be connected to a liquid source and wherein the conduit is moveable to an upper fill position wherein the first connector of the conduit is connected to the liquid source in a manner to permit liquid to flow from the source into the liquid reservoir through the conduit and through the second port when the second connector is in engagement with the retaining member in a manner to permit fluid communication between the conduit and the liquid reservoir via the second port.

10. A method for using a liquid container comprising the steps of:
    providing a container body with a base and at least one side wall extending generally upwardly from the base to define a liquid reservoir, said side wall including a first port adjacent the base, a flexible fill/drain conduit having a first end with a first connector adapted for connection to the first port and a second end with a second connector, and a retaining member connected to the container body above a maximum recommended liquid level of the liquid reservoir, the retaining member being adapted for engagement with the second connector in a manner to retain the second end of the conduit above the maximum recommended liquid level of the liquid reservoir when the conduit is in a storage position;
    connecting the first connector of the conduit with the first port in a manner to permit fluid communication between the conduit and the liquid reservoir via the first port;

disengaging the second connector of the conduit from the retaining member;

moving the conduit from its storage position to a lower fill position wherein the second connector of the conduit is adjacent a liquid source;

connecting the second connector of the conduit to the liquid source in a manner to permit liquid to flow from the liquid source into the liquid reservoir through the conduit and through the first port; and filling the liquid reservoir to a level at or below the maximum recommended liquid level of the liquid reservoir.

11. The method of claim 10 further comprising the steps of:

disconnecting the second connector of the conduit from the liquid source;

moving the conduit from its lower fill position to its storage position; and connecting the second connector of the conduit to the retaining member.

12. The method of claim 11 further comprising the step draining the liquid reservoir by:

disconnecting the second connector of the conduit from the retaining member; and moving the conduit to a drain position wherein the second end of the conduit is below the first port to thereby permit gravity drainage of the liquid reservoir through the first port and through the conduit.

13. The method of claim 10 wherein the step of providing a container body includes providing a valve adjacent the first port, the valve being operable between an open position that permits fluid communication between the conduit and the liquid reservoir via the first port and a closed position that substantially prevents fluid communication between the conduit and the liquid reservoir via the first port.

14. The method of claim 13 further comprising the step of moving the valve to its open position before performing the step of filling the liquid reservoir.

15. The method of claim 14 further comprising the steps of:

moving the valve to its closed position after completing the step of filling the liquid reservoir;

disconnecting the second connector of the conduit from the liquid source;

moving the conduit from its lower fill position to its storage position; and connecting the second connector of the conduit to the retaining member.

16. The method of claim 15 wherein the step of moving the valve to its closed position is performed before the steps of disconnecting the second connector from the liquid source, moving the conduit to its storage position, and connecting the second connector to the retaining member.

17. The method of claim 15 further comprising the step draining the liquid reservoir by:

disconnecting the second connector of the conduit from the retaining member;

moving the conduit to a drain position wherein the second end of the conduit is below the first port; and moving the valve to its open position to thereby permit gravity drainage of the liquid reservoir through the first port and through the conduit.

18. A method for using a liquid container comprising the steps of:

providing a container body with a liquid reservoir, a first port located adjacent a base of the container body, a second port located above a maximum recommended liquid level of the liquid reservoir, a flexible fill/drain conduit having a first end with a first connector adapted for connection to the first port and a second end with a second connector adapted for connection with the second port when the conduit is in a storage position, and a valve adjacent the first port and operable between an open position that permits fluid communication between the conduit and the liquid reservoir via the first port and a closed position that substantially prevents fluid communication between the conduit and the liquid reservoir via the first port;

connecting the second connector of the conduit with the second port in a manner to permit fluid communication between the conduit and the liquid reservoir via the second port;

moving the valve to its closed position;

disengaging the first connector of the conduit from the first port;

moving the conduit from its storage position to an upper fill position wherein the first connector of the conduit is adjacent a liquid source;

connecting the first connector of the conduit to the liquid source in a manner to permit liquid to flow from the liquid source into the liquid reservoir through the conduit and through the second port; and filling the liquid reservoir to a level at or below the maximum recommended liquid level of the liquid reservoir.

19. The method of claim 18 further comprising the steps of:

disconnecting the first connector of the conduit from the liquid source;

moving the conduit from its upper fill position back to its storage position; and connecting the first connector of the conduit to the first port.

20. The method of claim 19 further comprising the step of draining the liquid reservoir by:

disconnecting the second connector of the conduit from the second port;

moving the conduit to a drain position wherein the second end of the conduit is below the first port; and moving the valve to its open position to thereby permit gravity drainage of the liquid reservoir through the first port and through the conduit.

* * * * *